United States Patent
Baarman et al.

(10) Patent No.: US 9,955,529 B2
(45) Date of Patent: Apr. 24, 2018

(54) SMART COOKWARE

(75) Inventors: David W. Baarman, Fennivlle, MI (US); Joshua B. Taylor, Rockford, MI (US); Scott A. Mollema, Rockford, MI (US); William T. Stoner, Jr., Ada, MI (US)

(73) Assignee: Access Business Group International LLC, Ada, MI (US)

( * ) Notice: Subject to any disclaimer, the term of this patent is extended or adjusted under 35 U.S.C. 154(b) by 949 days.

(21) Appl. No.: 13/143,517

(22) PCT Filed: Jan. 5, 2010

(86) PCT No.: PCT/US2010/020063
§ 371 (c)(1),
(2), (4) Date: Aug. 18, 2011

(87) PCT Pub. No.: WO2010/080738
PCT Pub. Date: Jul. 15, 2010

(65) Prior Publication Data
US 2012/0000903 A1    Jan. 5, 2012

Related U.S. Application Data

(60) Provisional application No. 61/142,715, filed on Jan. 6, 2009.

(51) Int. Cl.
*H05B 1/02* (2006.01)
*A47J 27/00* (2006.01)
(Continued)

(52) U.S. Cl.
CPC .......... *H05B 1/0266* (2013.01); *A47J 27/002* (2013.01); *A47J 27/004* (2013.01);
(Continued)

(58) Field of Classification Search
CPC .. H05B 6/062; H05B 2213/06; H05B 6/1263; H05B 2213/07; Y02B 40/123
(Continued)

(56) References Cited

U.S. PATENT DOCUMENTS 3,742,174 A    6/1973    Harnden, Jr.
3,742,175 A    6/1973    Harnden, Jr.
(Continued)

FOREIGN PATENT DOCUMENTS

CN    2847774    12/2006
CN    101295863    10/2008
(Continued)

OTHER PUBLICATIONS

Jerome Patoux, Cooking Inductively: ADI iCoupler Technology Isolates the Hob and the User Interface, Analog Dialogue, Mar. 2008, 42-03.
(Continued)

*Primary Examiner* — Tu B Hoang
*Assistant Examiner* — Thomas Ward
(74) *Attorney, Agent, or Firm* — Warner Norcross & Judd LLP

(57) ABSTRACT

An inductively powered cooking appliance and an associated wireless power supply for producing an electromagnetic field. The cooking appliance may include a secondary and a metal portion where the wireless power supply is capable of providing power to both. The cooking appliance may communicate with the wireless power supply to control the temperature of the metal portion and the amount of power transferred to the secondary. A smart handle connected to the secondary may be capable of performing various functions. The smart handle may also be capable of displaying and monitoring temperature.

5 Claims, 12 Drawing Sheets

(51) Int. Cl.
*A47J 27/022* (2006.01)
*H05B 6/06* (2006.01)

(52) U.S. Cl.
CPC ............ *A47J 27/022* (2013.01); *H05B 6/062* (2013.01); *H05B 2213/06* (2013.01); *H05B 2213/07* (2013.01)

(58) Field of Classification Search
USPC .................. 219/620–627; 99/342, 422–425; 374/141–156; 126/373.1–390.1
See application file for complete search history.

(56) References Cited

U.S. PATENT DOCUMENTS

| | | | |
|---|---|---|---|
| 3,742,178 A | 6/1973 | Harnden, Jr. | |
| 3,887,781 A | 6/1975 | Peters, Jr. | |
| 5,746,114 A | 5/1998 | Harris | |
| 5,954,984 A | 9/1999 | Ablah et al. | |
| 6,157,011 A * | 12/2000 | Lai ....................... | H05B 6/1227 126/275 E |
| 6,206,564 B1 | 3/2001 | Adamczewski | |
| 6,232,585 B1 | 5/2001 | Clothier et al. | |
| 6,274,856 B1 | 8/2001 | Clothier et al. | |
| 6,316,753 B2 | 11/2001 | Clothier et al. | |
| 6,320,169 B1 | 11/2001 | Clothier | |
| 6,320,324 B1 | 11/2001 | Kusunoki et al. | |
| 6,444,961 B2 | 9/2002 | Clothier et al. | |
| 6,504,135 B2 | 1/2003 | Clothier et al. | |
| 6,578,469 B2 | 6/2003 | Sharpe | |
| 6,657,170 B2 | 12/2003 | Clothier | |
| 6,664,520 B2 | 12/2003 | Clothier | |
| 6,774,346 B2 | 8/2004 | Clothier | |
| 6,812,440 B2 | 11/2004 | Hirota et al. | |
| 6,822,204 B2 | 11/2004 | Clothier | |
| 6,942,383 B2 * | 9/2005 | Kwon .................. | A47J 45/068 374/141 |
| 6,953,919 B2 | 10/2005 | Clothier | |
| 6,956,188 B2 | 10/2005 | de Rooij et al. | |
| 7,114,510 B2 | 10/2006 | Peters et al. | |
| 7,355,150 B2 | 4/2008 | Baarman et al. | |
| 7,478,749 B2 | 1/2009 | Clothier et al. | |
| 7,573,005 B2 | 8/2009 | Clothier | |
| 7,794,142 B2 | 9/2010 | Clothier et al. | |
| 7,816,632 B2 | 10/2010 | Bourke, III et al. | |
| RE42,513 E | 7/2011 | Clothier | |
| 8,192,080 B2 | 6/2012 | Clothier | |
| 8,251,581 B2 | 8/2012 | Clothier et al. | |
| 8,258,441 B2 | 9/2012 | Clothier | |
| 8,286,497 B2 | 10/2012 | Clothier et al. | |
| 8,350,196 B2 | 1/2013 | Buchanan | |
| 8,389,910 B2 | 3/2013 | Bourke, III et al. | |
| 2009/0194526 A1 * | 8/2009 | Buchanan .............. | H05B 6/062 219/600 |
| 2010/0064901 A1 | 3/2010 | Clothier et al. | |
| 2010/0176120 A1 * | 7/2010 | Watanabe .............. | H05B 6/062 219/624 |
| 2011/0038395 A1 | 2/2011 | Sorkine et al. | |
| 2011/0090937 A1 | 4/2011 | Malyshev et al. | |
| 2012/0205837 A1 | 8/2012 | Clothier | |
| 2012/0230365 A1 | 9/2012 | Clothier | |
| 2012/0250726 A1 | 10/2012 | Sorkine | |
| 2013/0015177 A1 | 1/2013 | Clothier | |

FOREIGN PATENT DOCUMENTS

| | | |
|---|---|---|
| DE | 4439095 | 5/1996 |
| EP | 0725556 | 8/1996 |
| EP | 0883327 | 12/1998 |
| EP | 1 037 508 | 9/2000 |
| EP | 1037508 | 9/2000 |
| JP | H 03-192684 | 8/1991 |
| JP | H05-190264 | 7/1993 |
| JP | H 08-315975 | 11/1996 |
| JP | 11-262446 | 9/1999 |
| JP | 3363239 | 10/2002 |
| TW | 355910 | 4/1999 |
| TW | 388910 | 5/2000 |
| WO | 99/41950 | 8/1999 |
| WO | 03/031876 | 4/2003 |
| WO | 2004/008923 | 1/2004 |
| WO | 2004095994 | 11/2004 |
| WO | 2009147664 | 12/2009 |

OTHER PUBLICATIONS

International Search Report and Written Opinion, International Application No. PCT/US2010/020063, International Filing Date May 1, 2010.

* cited by examiner

SMART COOKWARE

BACKGROUND OF THE INVENTION

The present invention relates to cooking and, more particularly, to smart cooking appliances.

Inductive cooking surfaces are becoming more popular with consumers as they become more affordable. They are safer in some regards because they do not rely on a flame or other direct heat and typically have better overall performance, including faster heating time.

Most inductive cooking surfaces operate by running AC power through an inductive element in order to generate a magnetic field. When a metal cooking appliance, such as a pan, is placed in the field, eddy currents are generated on the pan. The energy from the eddy currents is dissipated as heat, causing the pan—and, by conduction, its contents—to be heated.

Most conventional cooking surfaces include controls to adjust the amount of heat. For example, many ovens, ranges, microwaves and toasters include knobs or keypads that enable a user to manually set the heat applied (e.g., the temperature of the oven) and the cooking time. With electric stoves the control varies the power delivered to an electric heating element. With a gas stove the control varies the flame size. In both cases, the temperature of the pan is not measured directly.

In some inductive cooking surfaces, the temperature of the cooking appliance is controlled by a microprocessor that adjusts the current level to correspond to a chosen heating level. A current measurement of the AC power being applied to the inductive cooking surface provides indirect feedback indicative of the amount of dissipated power, and therefore heat being produced in the pan. The lack of direct temperature control feedback can make it difficult to predict pan temperatures with the desired level of accuracy.

One attempt to enhance the control of an inductive cooking surface is to use a thermo-couple touch-pad. The thermo-couple touch-pad is attached to the inductive cooking surface and contacts the bottom of the pan when the pan is placed on the cooking surface in order to provide direct temperature feedback to the inductive cooking surface microprocessor during operation. This type of feedback is typically used to shut down the induction cooking surface in the event of overheating. Physical contact between the thermo-couple touch pad and the bottom of the pan can be problematic because of misalignment and malfunction issues.

Some inductive cooking surfaces have addressed these issues by providing wireless power to heating electronics housed on the cooking appliance itself instead of heating by directly exciting the bottom of a metallic pan. That is, the cooking appliance may apply the received wireless power to an internal electric heating element. In this configuration, because an electric heating element is used, many of the drawbacks associated with electric stoves persist. One embodiment of an inductive cooking surface that includes this approach is described in U.S. Pat. No. 7,355,150, which is herein incorporated by reference in its entirety.

SUMMARY OF THE INVENTION

The aforementioned problems are overcome in the present invention wherein a wireless power supply is used to 1) wirelessly heat an apparatus to a desired temperature; and 2) wirelessly provide a desired amount of power to the apparatus.

A wireless power supply 1) wirelessly heats a metal portion of an apparatus to a desired temperature when the metal portion of the apparatus is placed near the wireless power supply and 2) wirelessly provides a desired amount of power to a secondary of the apparatus when the secondary is placed near the wireless power supply. In some embodiments the wireless power supply heats the apparatus simultaneously while providing power to the secondary coil at different times. In alternative embodiments power is supplied either to heat the apparatus or to power the secondary coil. Control of the wireless power supply can provide control of both the temperature of the metal portion of the apparatus and the amount of power transferred to the secondary of the apparatus.

The power transferred to the secondary of the apparatus can optionally be stored in a power storage circuit, such as a capacitor or battery. The power storage circuit may provide power to other circuitry within the apparatus during operation, such as while the apparatus is being heated. This provides a simple solution that allows the apparatus to be both heated and charged by the same wireless power supply. Alternatively, an apparatus without power storage circuitry can receive power in the secondary while the wireless power supply heats the apparatus.

In one embodiment, the wireless power supply is an inductive power supply and the apparatus is a cooking appliance with a smart handle. In one configuration, a metal portion of the cooking appliance may be placed within the magnetic field generated by the inductive power supply to heat the cooking appliance. In another configuration, a secondary in the smart handle may be placed within the magnetic field generated by the inductive power supply to charge the smart handle. That is, the inductive power supply inductively heats the cooking appliance or charges the smart handle, depending on which is positioned near the inductive power supply. The charged smart handle can provide various features while cooking including, but not limited to, communication with the inductive power supply, temperature monitoring, temperature control, and temperature display.

In another embodiment, the wireless power supply is an inductive power supply and the apparatus is a cooking appliance with a smart handle. In this embodiment, the metal portion and the secondary may be simultaneously placed within the magnetic field generated by the inductive power supply. The metal portion and the secondary are positioned near the inductive power supply, which allows the inductive power supply to concurrently heat the cooking appliance and provide power to the smart handle.

One advantage of the present invention is the ability to power the electronics of a cooking appliance using the same inductive power supply that is used to heat, directly or indirectly, the cooking appliance. In some embodiments, this power may be used to power a direct thermocouple temperature feedback located on the cooking appliance, which ultimately can provide better control of the heating.

These and other objects, advantages and features of the invention will be more readily understood and appreciated by reference to the detailed description of the drawings.

DETAILED DESCRIPTION OF THE DRAWINGS

Figure 1:
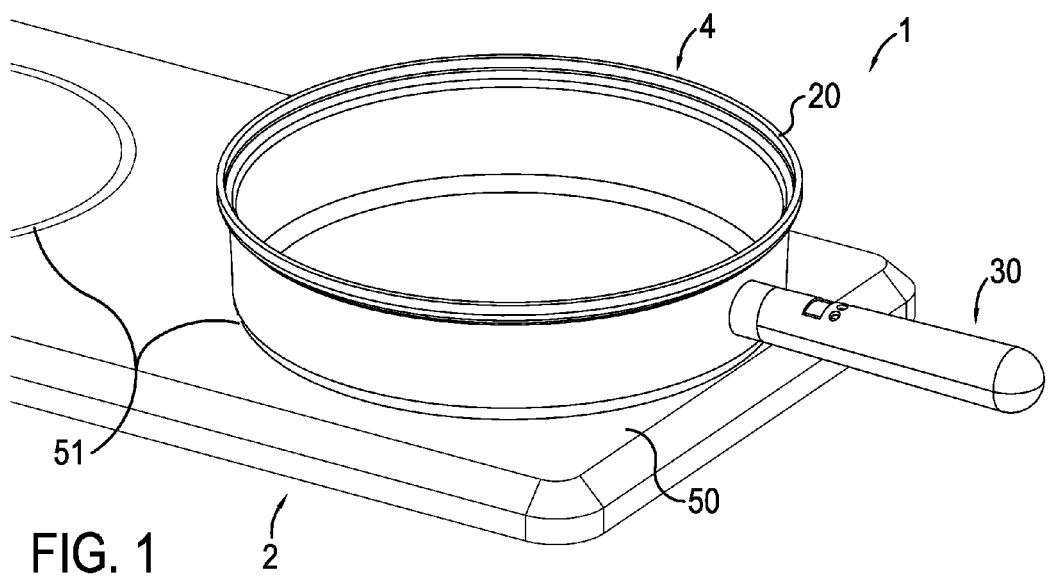
FIG. 1 illustrates a perspective view of an inductive cooking system of one embodiment of the present invention in a first configuration.

FIG. 1 shows one embodiment of an inductive cooking system 1 including an inductive power supply 2 and a cooking appliance 4. The cooking appliance 4 includes a first portion for receiving power from the inductive power supply 2 to heat the cooking appliance 4 and a second portion for receiving power from the inductive power supply 2 to power the cooking appliance 4. In the illustrated embodiment, the cooking appliance 4 is a pan that includes a body 20 and a smart handle 30. In the illustrated embodiment, the first portion for receiving power to heat the cooking appliance 4 includes at least a portion of metal in the body 20 of the cooking appliance 4 and the second portion for receiving power to power the cooking appliance 4 includes a secondary in the smart handle 30 of the cooking appliance 4. The inductive power supply 2 may include an inductive charging surface 50 with one or more charging areas 51 for wirelessly supplying power to the cooking appliance 4. In alternative embodiments, the inductive power supply includes a single charging area 51 that can be used to charge both the smart handle 30 and heat the body 20 of the cooking appliance, depending on the configuration.

Figure 5:
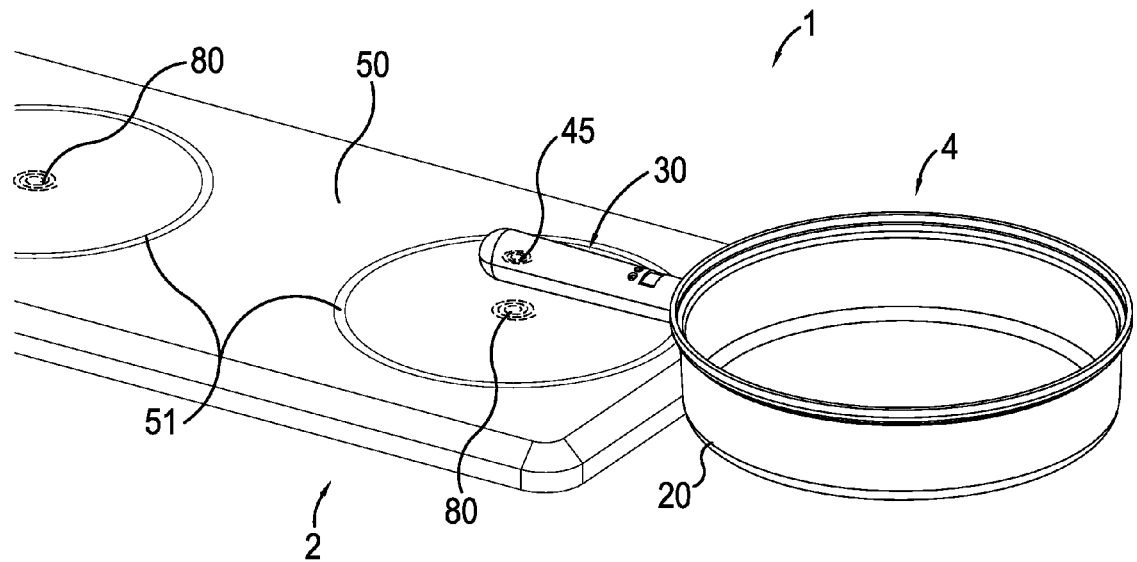
FIG. 5 illustrates a perspective view of the inductive cooking system of the FIG. 1 embodiment in a second configuration.

In one embodiment, the inductive cooking system 1 has at least two configurations. One embodiment of a first configuration is shown in FIG. 1. The first portion for receiving power to heat the cooking appliance, in FIG. 1 the body 20 of the cooking appliance 4, is placed in proximity to the inductive charging surface 50 within the magnetic field generated by the inductive power supply 2. One embodiment of a second configuration is shown in FIG. 5. The second portion for receiving power to power the cooking appliance, in FIG. 5 the smart handle 30 of the cooking appliance 4, is placed in proximity to the inductive charging surface 50 within the magnetic field generated by the inductive power supply 2. In the current embodiment, the inductive cooking system 1 can be switched between at least these two configurations in order to either heat the body 20 of the cooking appliance 4 or charge the smart handle 30 of the cooking appliance 4. In alternative embodiments, the body of the cooking appliance 4 may be heated simultaneously while charging the smart handle.

Although the illustrated embodiments are directed to inductive cooking systems, it will be understood that the scope of the invention is not so limited. Any system that utilizes a wireless power supply that 1) wirelessly heats an apparatus to a desired temperature; and 2) wirelessly provides a desired amount of power to the apparatus is within the scope of the invention. Further, a myriad of different inductive techniques may be used to generate heat. For example, direct or indirect heat generated by the primary coil may be used to heat the cooking appliance. In one direct heat embodiment, magnetically induced eddy currents produce heat on a metal surface of a cooking appliance. In one indirect heat embodiment, a primary coil or other circuit element is selected that generates heat through losses when power is applied to the coil. In another embodiment, the inductive power supply provides power to a secondary in the inductive cooking appliance, which in turn supplies power to a heating element in electrical communication with the secondary.

Further, the inductive cooking system illustrated in the drawings is merely one example of an inductive cooking system within the scope of the invention. Alternative inductive cooking system embodiments are also contemplated. For example, it will be understood that the cooking appliance need not be a pan with a smart handle as illustrated in the figures. The cooking appliance could be a smart toaster, smart coffee maker, smart griddle, or any other smart cooking appliance capable of being heated by an inductive power supply to a desired temperature and utilizing power received from an inductive power supply.

The present invention is suitable for use with most inductive power supplies. Accordingly, the inductive power supply 2 will not be described in detail. Suffice it to say that the inductive power supply 2 illustrated in FIG. 4 includes rectification and power conditioning circuitry 84, a controller 86, an inverter 82, communication circuitry 88, and a primary 80 and capacitor 81 that form a tank circuit. The inductive power supply 2 generates and applies alternating current to the primary 80. As a result of the alternating current applied by the inductive power supply, the primary 80 generates an electromagnetic field. The inductive power supply may be essentially any circuitry capable of supplying alternating current to the primary 80.

It may be desirable to use an inductive power supply including the resonant seeking circuit of the inductive power supply system disclosed in U.S. Pat. No. 6,825,620, which is entitled "Inductively Coupled Ballast Circuit" and issued Nov. 30, 2004, to Kuennen et al; the adaptive inductive power supply of U.S. Pat. No. 7,212,414, which is entitled "Adaptive Inductive Power Supply" and issued May 1, 2007, to Baarman; the inductive power supply with communication of U.S. Ser. No. 10/689,148, which is entitled "Adaptive Inductive Power Supply with Communication" and filed on Oct. 20, 2003 to Baarman; the inductive power supply for wirelessly charging a LI-ION battery of U.S. Ser. No. 11/855,710, which is entitled "System and Method for Charging a Battery" and filed on Sep. 14, 2007 by Baarman; the inductive power supply with device identification of U.S. Ser. No. 11/965,085, which is entitled "Inductive Power Supply with Device Identification" and filed on Dec. 27, 2007 by Baarman et al; or the inductive power supply with duty cycle control of U.S. Ser. No. 61/019,411, which is entitled "Inductive Power Supply with Duty Cycle Control" and filed on Jan. 7, 2008 by Baarman—all of which are incorporated herein by reference in their entirety.

Figure 2:
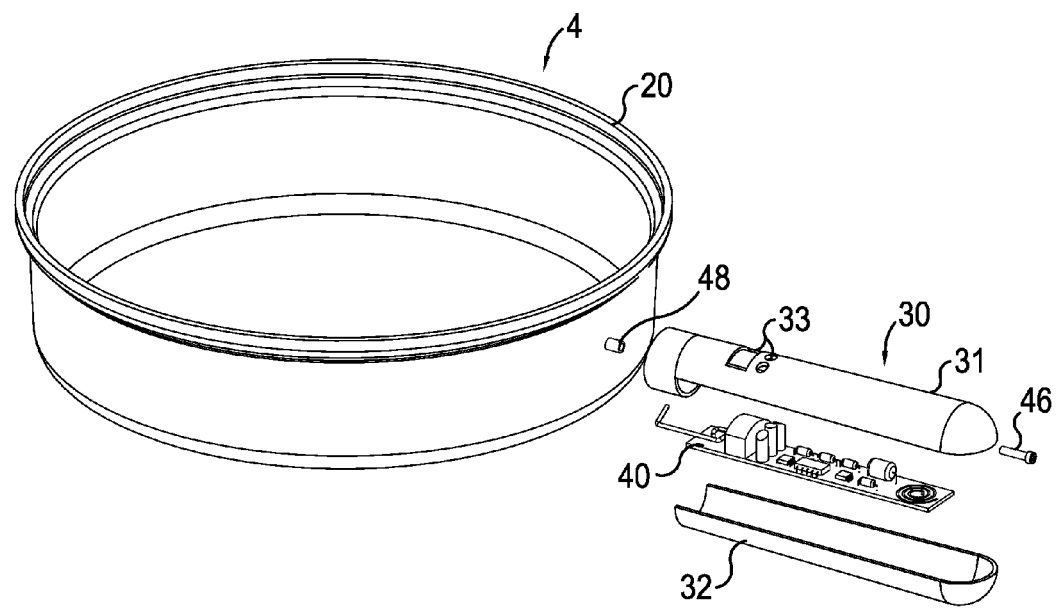
FIG. 2 illustrates an exploded view of the cooking appliance of the FIG. 1 embodiment.

Referring to FIG. 2, the illustrated cooking appliance 4 is a pan that includes a body 20 capable of being heated by an inductive power supply and a smart handle 30 capable of receiving and utilizing power from an inductive power supply. In the current embodiment, the body 20 is made of metal, specifically the body includes stainless steel side walls and a laminated slab bottom made of a combination of stainless steel, mild steel, and aluminum. But the system is not limited to these types of pans. For example a cast iron pan could work with an induction range. In alternative embodiments, the body may be made from a variety of other materials, for example, cast iron, aluminum, copper, anodized aluminum, stainless steel, or some other material or combination of materials that is capable of being heated by an inductive power supply. The body 20 of the pan has approximately an 8 to 12 inch diameter with straight sides approximately 1 to 2 inches tall. Of course, alternative embodiments may have different dimensions.

Figure 7:
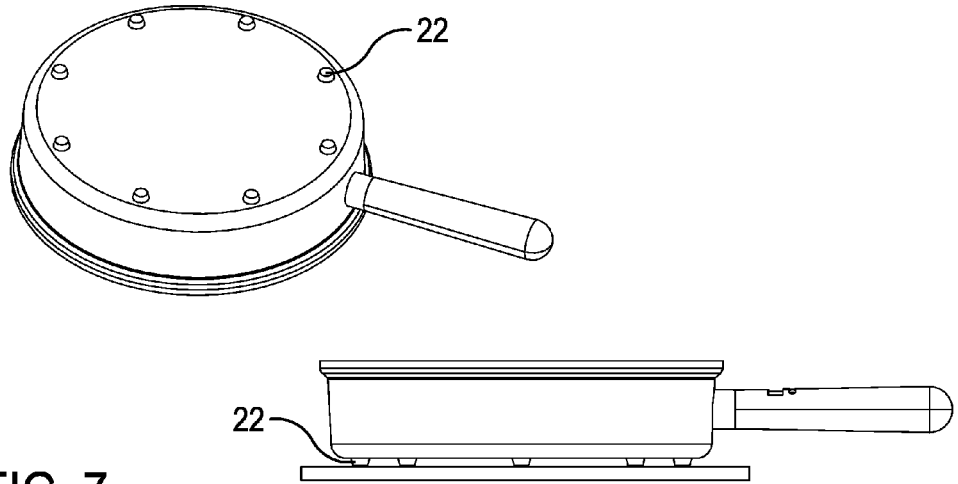
FIG. 7 illustrates perspective and side view of another embodiment of the inductive cooking system.

In alternative embodiments, only a portion of the body 20 may be capable of being heated by the inductive power supply. That is, a portion of the body 20 may be conducting and another portion non-conducting. For example, a portion of the body 20 may be metal and another portion may be rubber. In one embodiment, as shown in FIG. 7, the body 20 of the cooking appliance 4 includes rubber feet 22. The rubber feet are made from heat resistant silicone, but could be made from virtually any material. Since the pan is heated by magnetic induction, the inductive power supply could be embedded in a counter surface, such as tile, stone, synthetic stone, etc. The rubber feet 22 act as a trivet and allow the heated pan to be moved from the cooking area to a serving area without burning the serving area. In an alternative embodiment, the rubber trivets could be replaced with a mat covering the entire bottom surface of the pan.

Referring back to FIG. 2, the body 20 also includes a screw lug 48 for fastening the smart handle 30 to the body 20. In alternative embodiments, the screw lug may be replaced with a different fastener element or removed altogether.

Figure 3:
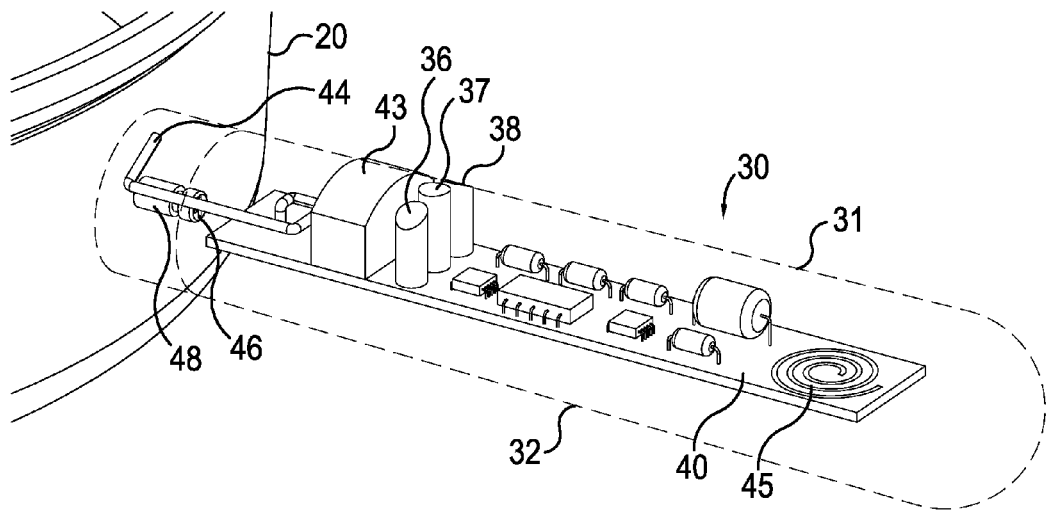
FIG. 3 illustrates a blown-up assembled hidden line view of the smart handle of the cooking appliance of the FIG. 1 embodiment.
Figure 6:
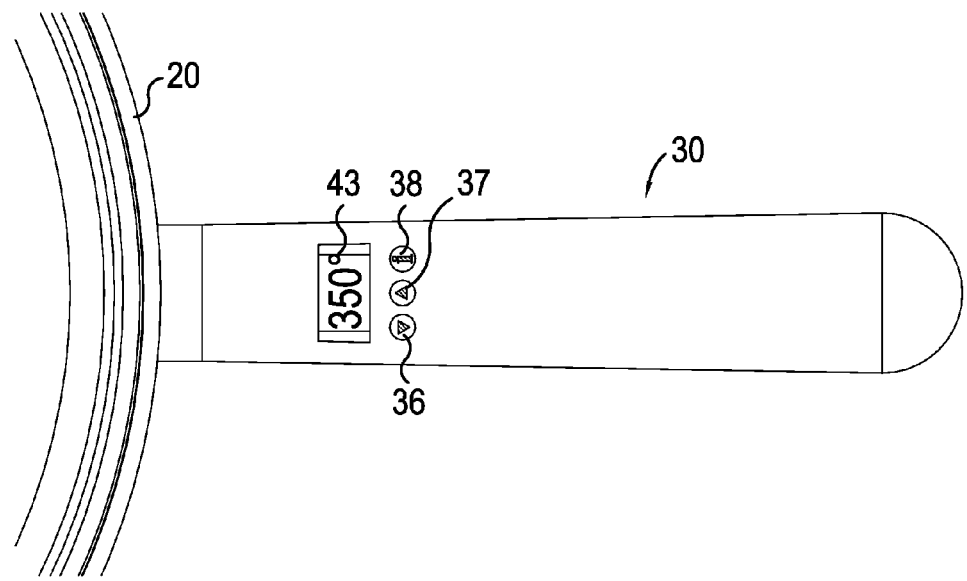
FIG. 6 illustrates a top view of the smart handle of the cooking appliance of the FIG. 1 embodiment.

One embodiment of the smart handle 30 of the cooking appliance 4 will now be described in detail with reference to FIGS. 2-3 and 6. In the illustrated embodiment, the smart handle 30 includes a handle body 31, a handle access panel 32, a screw 46, and a smart handle circuit 40. The handle body 31 and handle access panel 32 releasably snap together to enclose and protect the smart handle circuit 40. In the current embodiment, the handle body 31 includes apertures 33 that allow the user interface of the smart handle circuit 40 to be accessed through the handle body 31. Other systems for enclosing or protecting the smart handle circuit 40 may replace the handle body 31 and handle access panel 32. In alternative embodiments, the handle body 31 and handle access panel 32 may be eliminated, and the smart handle circuit 40 may be integrally formed with the cooking appliance 4.

The smart handle 30 is fastened to the body 20 of the cooking appliance 4 with a screw 46 that screws into screw lug 48 of the body 20. Other fastening systems may replace the simple screw and screw lug configuration shown in the illustrated embodiments. In alternative embodiments, the smart handle 30 and body 20 may be integrally formed and the fastening system may be eliminated.

The smart handle 30 of the illustrated embodiment is a simple stick pan handle. In alternative embodiments, other smart handle configurations may replace or supplement the simple stick pan handle. For example, additional smart handles may be attached to the cooking appliance or one or more pot holder handles may replace the stick pan handle altogether.

Additionally, in some alternative embodiments, the smart handle 30 may be eliminated and the circuit 40 may be relocated elsewhere. For example, in one embodiment, the circuit may be re-located in a cooking appliance lid (not shown). In another alternative embodiment, the circuit may be located in body 20 of the cooking appliance 4 or attached to the cooking appliance 4 in a non-handle configuration. In one alternative embodiment, shown in FIG. 10, the circuit is located in an auxiliary controller 53 separate from the cooking appliance. The auxiliary controller 53 can communicate with the smart handle or with the inductive power supply directly. In embodiments where the auxiliary controller communicates directly with the inductive power supply, the smart handle may be eliminated entirely.

Figure 4:
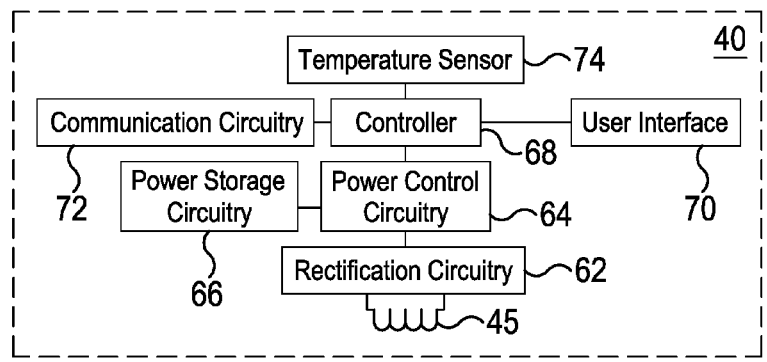
FIG. 4 illustrates a block diagram of an inductive power supply and a smart handle.

The current embodiment of the smart handle circuit 40 is described in connection with the block diagram shown in FIG. 4. the smart handle circuit 40 includes a secondary 45, rectification circuitry 62, power control circuitry 64, power storage circuitry 66, a controller 68, communication circuitry 72, a temperature sensor 74, and a user interface 70. Additional, different, or fewer components may be used in alternative embodiments of the smart handle circuit.

The secondary 45 in the illustrated embodiment is a secondary coil capable of being inductively energized when the smart handle 30 is placed in proximity of the inductive charging surface 50 within the magnetic field generated by the inductive power supply 2. The primary and secondary are designed to provide a sufficient amount of power for a sufficient amount of time to achieve the desired results.

The current embodiment includes rectification circuitry 62. Rectification circuitry is well known and therefore will not be described in detail. Suffice it to say, the rectification circuitry in the current embodiment converts the AC power received in the secondary into DC power. In alternative embodiments, the rectification circuitry may be eliminated and the smart handle circuit may be powered with AC power.

The power control circuitry 64 controls the amount of power to the rest of the smart handle. In an active cooking embodiment, during cooking mode the power control circuitry 64 controls the power level delivered to the pan. In a passive or active cooking embodiment, during charging mode the power control circuitry 64 controls the power level delivered to the smart handle. In some embodiment's the power control circuitry may include intelligence such as heating profiles, powering profiles or charging profiles. The profiles may be stored in memory, controlled by the secondary or controlled by a remote device (such as a PDA or auxiliary remote control).

The present invention is suitable for use with a variety of power storage circuits. Accordingly, the power storage circuitry 66 will not be described in detail. The power storage circuitry 66 is capable of storing power received in the secondary 45 for use at a later time. One example of power storage circuitry 66 is the capacitor charging disclosed in U.S. Patent Application Ser. No. 61/079,301 filed by Baarman on Jul. 9, 2008, which is herein incorporated by reference. In alternative embodiments, the power storage circuitry 66 may be a battery.

The present invention is suitable for use with a variety of controllers running programs to provide a variety of different functions. Accordingly, the controller 68 will not be described in detail. In one embodiment, the controller 68 is a PIC30F3010 microcontroller, manufactured by Microchip, Inc., of Chandler, Ariz. The controller 68 is capable of being programmed to interface with temperature sensor 44, communication circuitry 72, and user interface 70 to perform a variety of different functions related to temperature monitoring, communicating with the inductive power supply, accepting temperature control input from a user, and displaying temperature information to a user.

The controller 68 may include memory (not shown). The memory may include information relating to the cooking characteristics of the cooking appliance 4. For example, memory could contain the heating curves for a pan, identify the current required of the primary to heat the pan to a temperature. This may allow a user to program a desired temperature for the pan. The system could then determine the most efficient method to bring the pan to the desired temperature as well as to maintain the pan at the desired temperature. Such a sequence may involve providing power to the pan at different current levels and different frequencies over a period of time.

Figure 8:
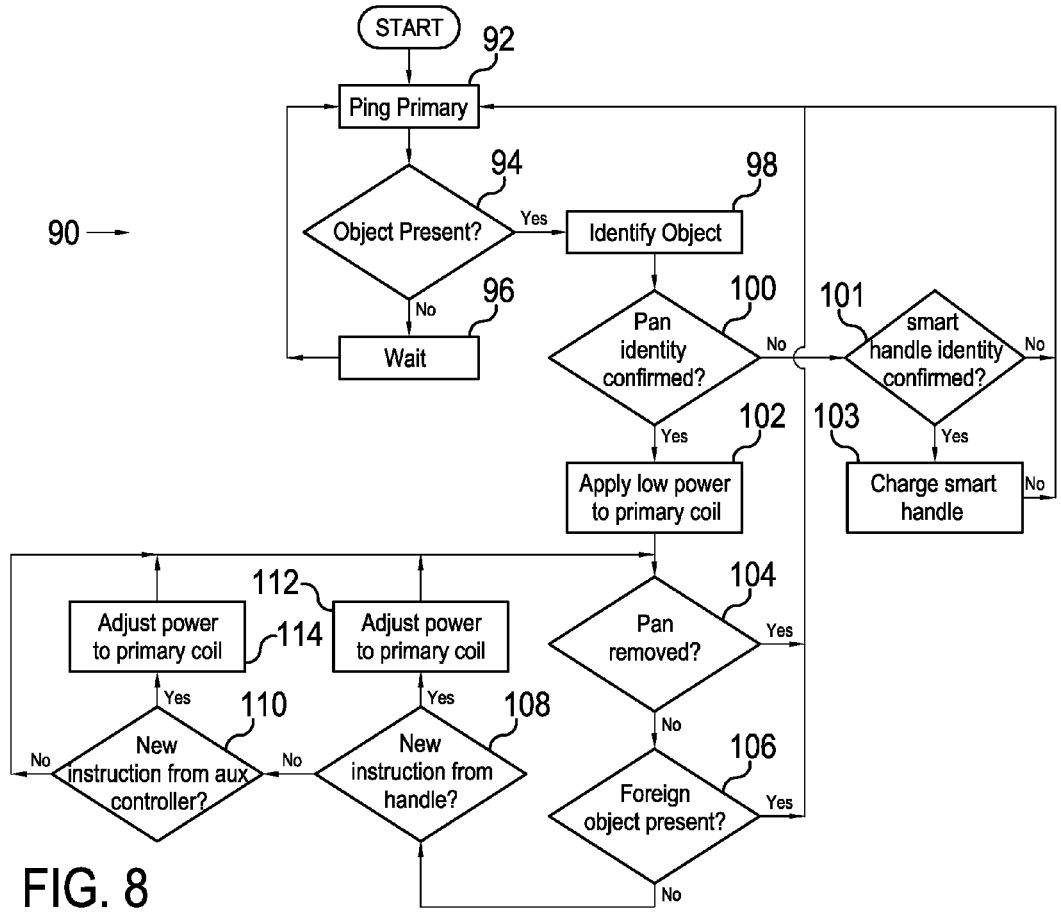
FIG. 8 illustrates a flow chart of one embodiment of a method for operating an inductive power supply system.
Figure 9:
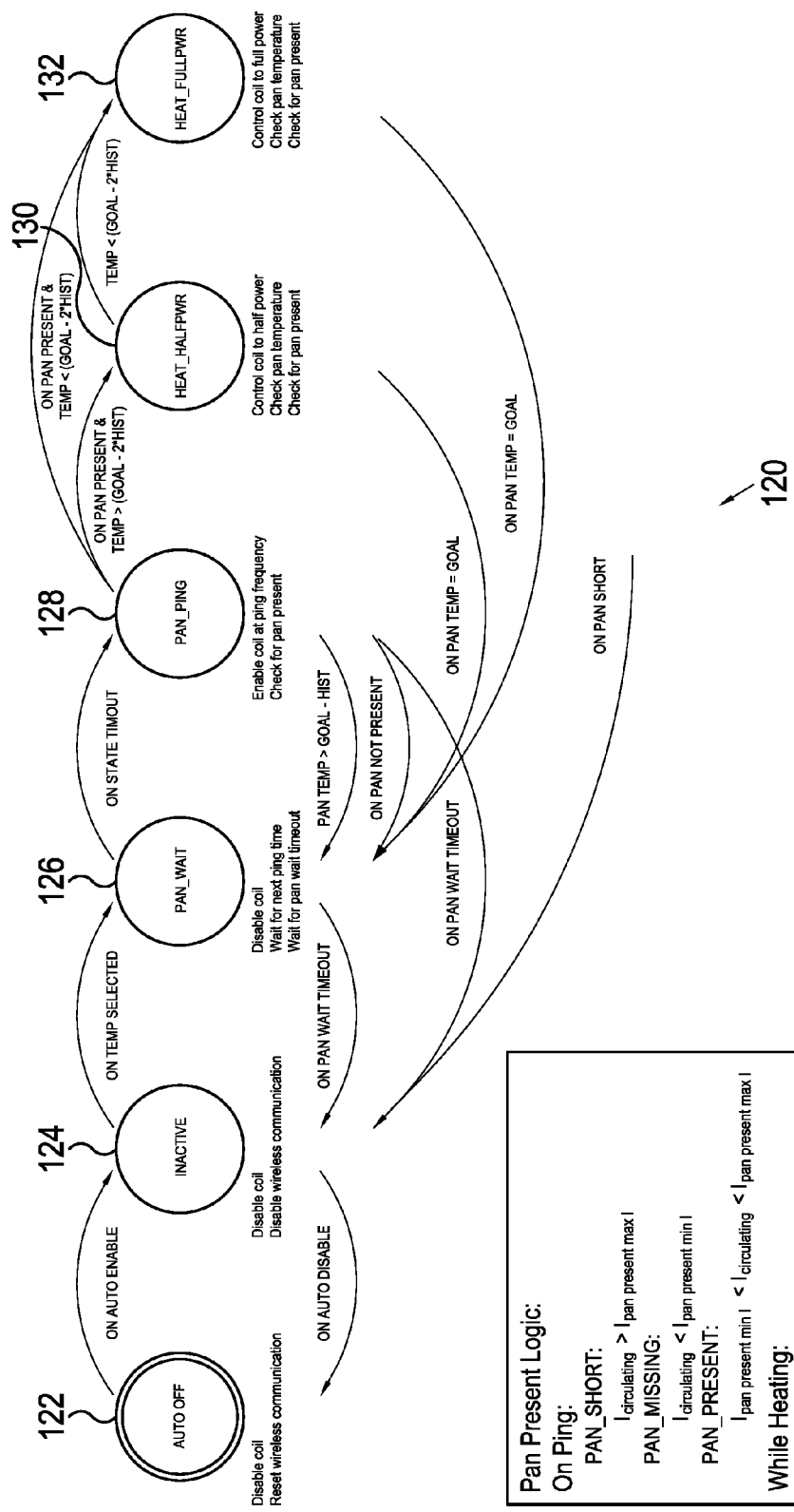
FIG. 9 illustrates a state diagram of one embodiment of a method for controlling an inductive power supply.

In general, FIGS. 8 and 9 illustrate exemplary algorithms that may be implemented with cooperation between controller 68 and the inductive power supply 2, and in some cases an auxiliary controller 53.

Figure 11:
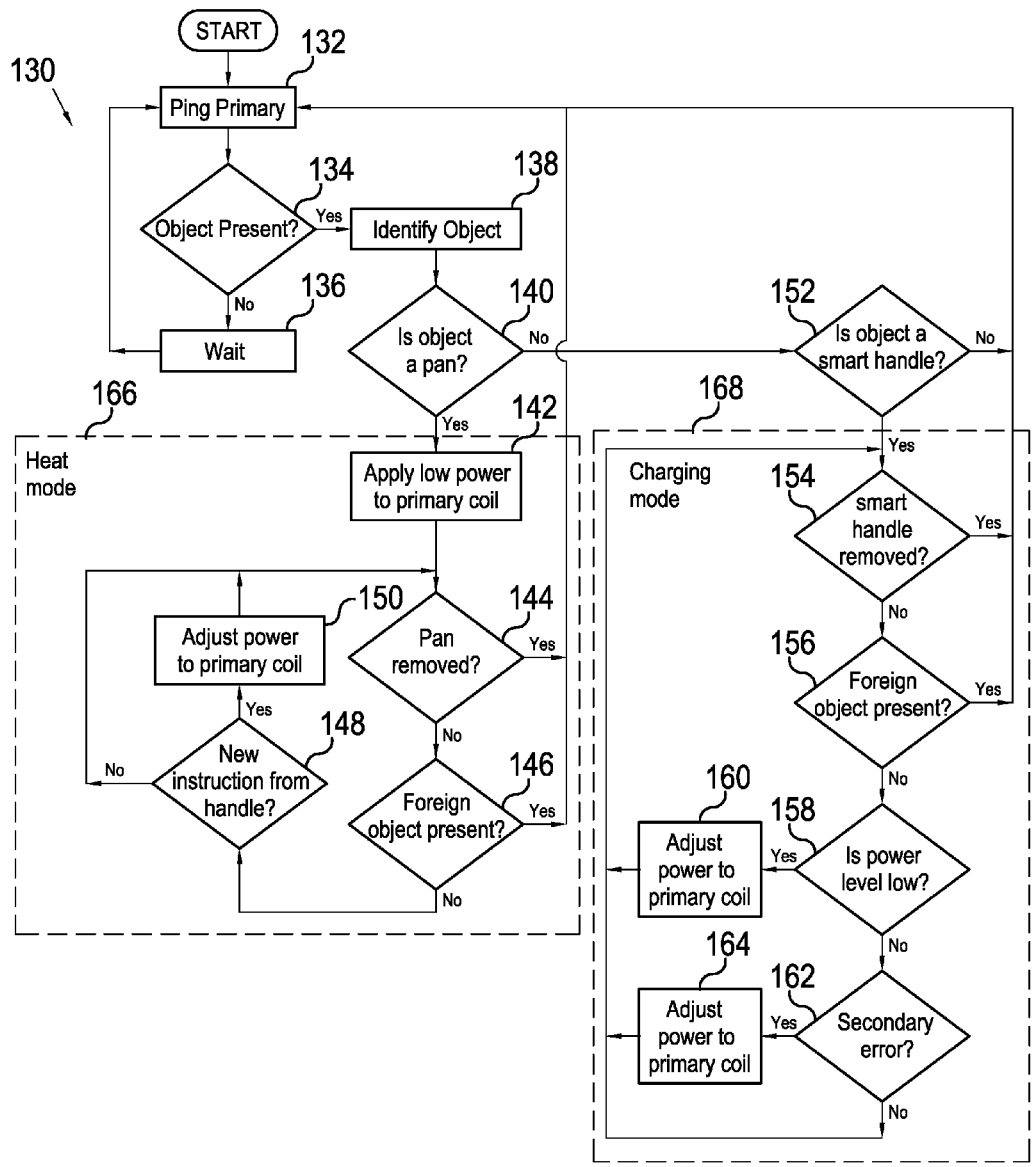
FIG. 11 illustrates a flow chart of one embodiment of a method for operating an inductive power supply system.
Figure 12:
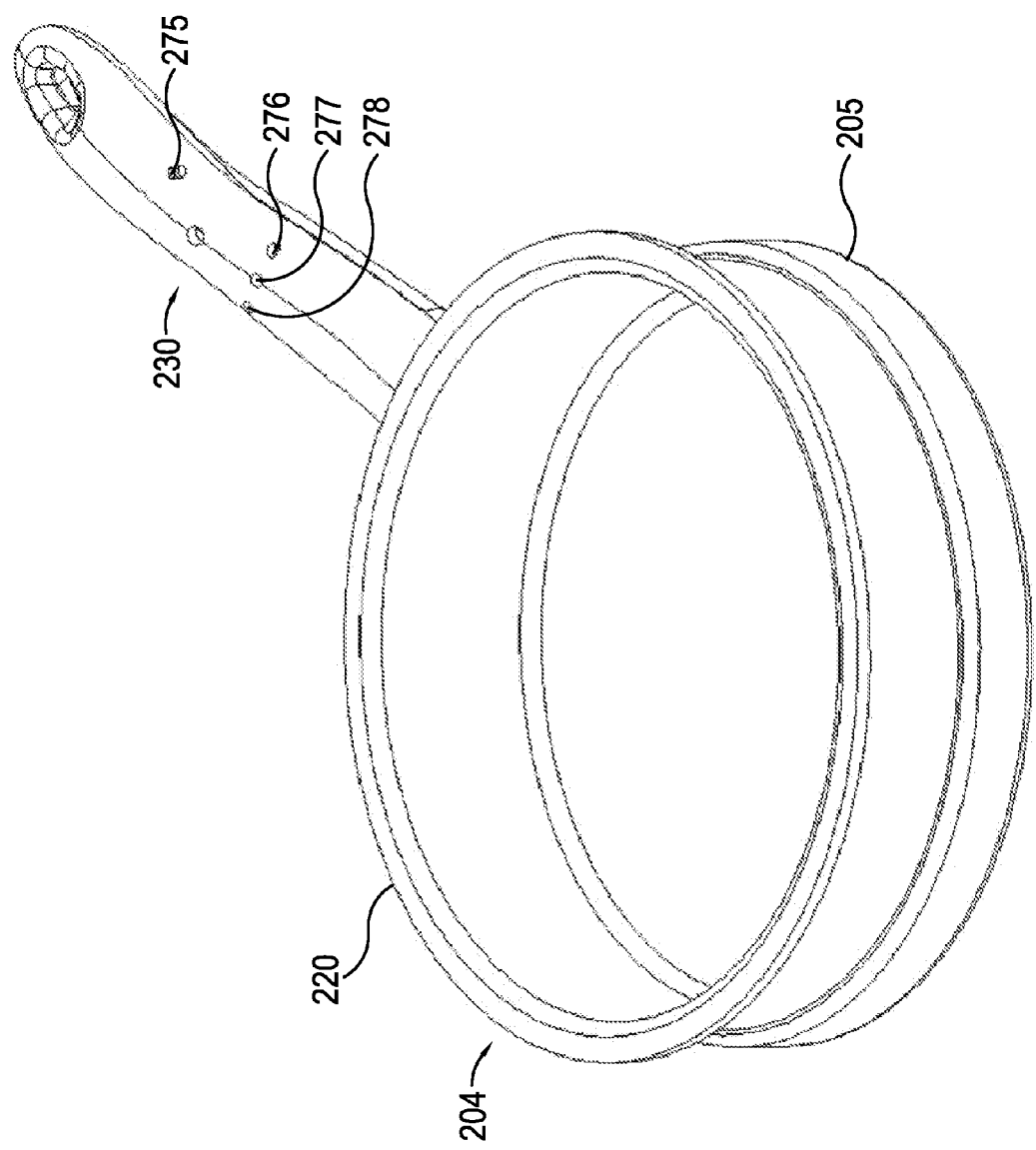
FIG. 12 illustrates a perspective view of another embodiment of the inductive cooking system.
Figure 13:
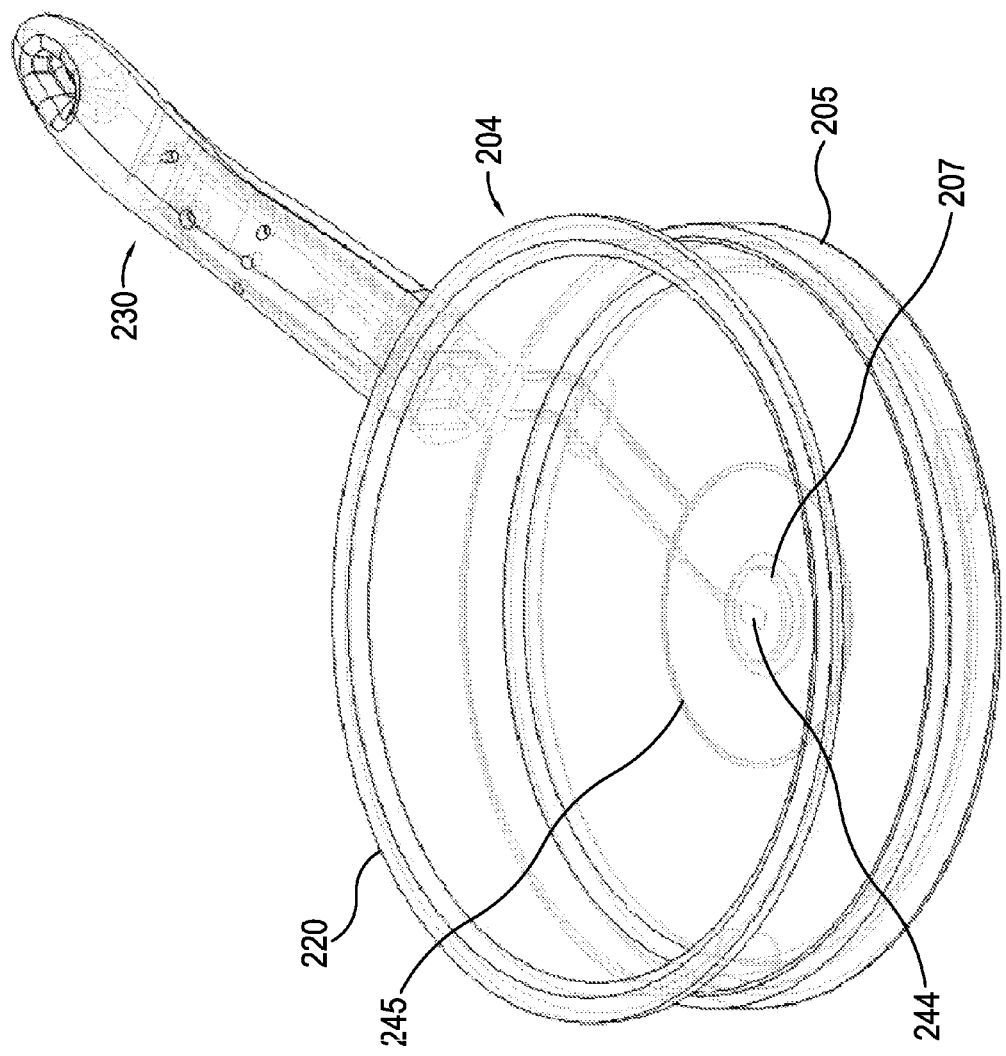
FIG. 13 illustrates a hidden line view of the cooking appliance of the FIG. 12 embodiment.

FIG. 11 describes one embodiment of a method for operating the inductive cooking system with an inductive power supply and a cooking appliance with a smart handle. The electronic controller in the inductive power supply pings the primary coil 132 and interprets the load on the primary to determine whether or not an object is present 134. Any reflected load from an object that is present may be translated to the inductive power supply though the pinging of the primary. If an object is not present, the inductive power supply waits 136 and periodically pings 132 to see if an object is brought within the proximity of the inductive power supply 134. If an object is present, the system attempts to identify the object 138.

The reflected impedance can be used to identify whether the object is the body of the cooking appliance or the smart handle because the reflected impedance is different for the body of the pan than for the secondary coil in the handle. Alternative identification methods may also be employed to identify the object. In the current embodiment, the inductive power supply includes a look-up table of threshold values in the controller that may be used to determine which mode of operation should be used. (i.e., Off, Cooking Mode, or Charging Mode). If the inductive power supply cannot identify the object as an appliance for heating or a device for charging then the inductive power supply returns to pinging to see if the pan is present 132. If the object is identified as a pan or other cooking appliance for heating 140, then the system enters a heating mode 166. During heating mode, low power is applied to the primary 142. The algorithm continuously checks whether the pan has been removed 144, whether a foreign object is present 146, or whether a new instruction has been received from the handle 148. If an instruction is received, the power to the primary is adjusted accordingly 150 and the algorithm continues checking whether the pan has been removed 144, whether a foreign object is present 146, or whether a new instruction has been received from the handle 148. In an alternative embodiment, if an instruction is not received from the handle the system may move to a safe operating mode waiting for the user to provide an instruction. The algorithm continues until the pan is removed or a foreign object is detected.

If the object is identified as a smart handle or other device for charging 152, then the system enters a charging mode 168. In charging mode, the system determines whether the object being charged has been removed 154. If it has, the system leaves charging mode 168 and enters an off mode or ping mode 132. If the object is present, the system determines whether a foreign object is present. 156. If a foreign object is present then the system leaves charging mode 168 and enters an off mode or ping mode 132. If a foreign object is not present then the system determines whether the power level is low 158. If the power level is low, for example below a threshold, then the system adjusts the power to the primary coil 160 and continues to check whether the handle has been removed or a foreign object is present. If the power level is not low, then the system determines whether the secondary error is greater than zero. If the secondary error is greater than zero then the system adjusts the power to the primary coil 164 and continues the loop. If the secondary error is not greater than zero, then the system continues the loop waiting for the handle to be removed or a foreign object to come in proximity. Of course, the system could include other factors to take the system out of charging mode. For example, the system could include a time restriction for being in charge mode, or a physical switch on the smart handle or the inductive power supply for the user to determine whether the object should be charged.

FIG. 8 describes one embodiment of a method for operating an inductive cooking system with an inductive power supply, cooking appliance with a smart handle, and an auxiliary controller. The method is similar to the FIG. 11 method. The primary difference is that during the heating mode, the system can accept new instructions from an auxiliary controller 110 and adjust the power to the primary coil 114 based on those instructions.

Specifically, in FIG. 8, the electronic controller in the inductive power supply pings the primary coil 92 and interprets the load on the primary to determine whether or not an object is present 94. If an object is not present, the inductive power supply waits 136 and periodically pings 132 to see if an object is brought within the proximity of the inductive power supply 134. If an object is present, the system attempts to identify the object 98.

If the inductive power supply cannot identify the object as an appliance for heating or a device for charging then the inductive power supply returns to pinging to see if the pan is present 132.

If the object is identified as a pan or other cooking appliance for heating 100, then the system enters a heating mode, During heating mode, low power is applied to the primary 102. The algorithm continuously checks whether the pan has been removed 104, whether a foreign object is present 106, or whether a new instruction has been received from the handle 108 or auxiliary controller 110. If an instruction is received, the power to the primary is adjusted accordingly 112, 114 and the algorithm continues the loop.

If the object is identified as a smart handle or other device for charging 101, then the system enters a charging mode where the smart handle is charged 103. One charging method has already been described in connection with FIG. 11. Suffice it to say, the set point control charging method described in FIG. 11 is merely exemplary and virtually any charging algorithm may be implanted to transfer power from the inductive power supply to the smart handle. Once the charging is complete the system may return to pinging the primary 92. as shown in the illustrated embodiment. In alternative embodiments, the system may continue charging the smart handle until the system receives another instruction, until the smart handle is removed, until a foreign object is placed in proximity of the inductive power supply. In another alternative embodiment, the inductive power supply may keep charging the device in a low charge mode. In another alternative embodiment, the system may enter a wait mode where the system waits for input from a user.

FIG. 9 illustrates one embodiment of a state diagram for heating the cooking device of the inductive cooking system. The default state is the AUTO_OFF state 122. Upon receiving an auto enable signal, such as the user operating the user interface, the system moves to an INACTIVE state 124. Once a user selects a temperature using the user interface, the system enters a PAN_WAIT state 129. If the user does not select a temperature, after a preselected amount of time the system reverts back to the AUTO_OFF state. In the PAN_WAIT state, the system waits for the next ping time. If the ping time comes then the system moves to a PAN_PING state 128. If the pan wait timeout comes before a ping time then the system reverts back to the INACTIVE state 124. During the PAN_PING state 128 the primary is energized at a ping frequency and a determination of whether a pan is present is made. The logic for determining whether or not the pan is present is shown in FIG. 9B. If the pan is not present then the system reverts to the PAN_WAIT state 126. If the pan temperature is greater than the goal temperature minus a hysteresis threshold then the system also reverts to the PAN_WAIT state 126.

Generally, a system with hysteresis is a system that may be in any number of states, independent of the inputs to the system. A system with hysteresis exhibits path-dependence, or "rate-independent memory". In the current embodiment during heating mode, the heating rate (or power delivery rate) changes depending on how close the system is to the goal. When the actual temperature of the pan is less than the goal minus two times the hysteresis threshold then the system knows it is "far" away from the goal and should apply power (or heat) at a higher rate. When the actual temperature is within one times the hysteresis threshold from the goal then the system knows to reduce the heating rate. Use of the hysteresis threshold helps reduce or eliminate overshooting the goal temperature.

If the pan wait times out then the system reverts to the INACTIVE state 124. That is, when the pan is present and not hot enough the system receives two signals. First, the ping tells the system that the pan is present. Second, the temperature feedback is communicated. If the pan is present and the temperature is less than the set point then the system should deliver more power. If the pan is present and the temperature is at or above the set point then the system should stop delivering power (i.e., ON PAN WAIT). If the time is too long then the system shut down (i.e., ON PAN WAIT TIMEOUT). If the pan is not present, then the reflected impedance on the ping will not indicate the presence of a pan (i.e., PAN NOT PRESENT). If the pan is removed when then the primary coil is on then the next ping indicates that the pan was removed (i.e., ON PAN NOT PRESENT). If the pan is present and the temperature is not close to the goal temperature then the HEAT_FULLPWR state 130 is entered where the coil is fully powered, pan presence is monitored, and pan temperature is monitored. If the pan is present and the temperature is close to the goal temperature then the HEAT_HALFPWR state 128 is entered where the coil is powered at half power, pan temperature is monitored, and pan presence is monitored. Once the goal temperature is reached, the system reverts to the PAN_ WAIT state 126. If during any state a foreign object is detected the system reverts to the INACTIVE state 124. If during any state the pan is missing the system reverts to the PAN_WAIT state 126.

The communication circuitry 72, 88 of the current embodiment are RF transceivers. In alternative embodiments, the communication circuitry 72, 88 may be any circuitry capable of sending and/or receiving communication wirelessly. In embodiments where one way communication is sufficient, the transceivers may be replaced with receivers or transmitters. The current embodiment uses an ANT RF protocol for communication. In alternative embodiments, communication circuitry 72 may be a wireless communication system using RF, Blue Tooth, eCoupled, 802.11b, 802.11g or any other proprietary or open wireless communication protocol.

The illustrated smart handle 30 also includes a temperature sensor 44 or thermo-couple for measuring the temperature of the cooking appliance 4. The temperature of the cooking appliance 4 can be directly measured using the thermo-couple. The sensor can relay the heat information, also referred to as temperature, to the controller so that the controller can monitor and adjust the temperature. That is, the smart handle can either send temperature measurements to the inductive power supply 2 or monitor the temperature measurement and instruct the inductive power supply 2 to adjust the temperature of the cooking device 4 to a desired temperature by changing a characteristic of the power output of the inductive power supply 2. By including a thermocouple on the cooking device itself, many of the challenges associated with monitoring the temperature of a cooking appliance in a traditional inductive cook-top can be avoided. In alternative embodiments, the smart handle does not include a temperature sensor.

For example, using the information from the cooking appliance, the cooking appliance or the inductive power supply can determine the amount of energy to be transferred to the appliance in order for the appliance to achieve a desired result. For example, if the cooking appliance were a pan and it was desired for the pan to be heated to 250° F., the system can calculate the amount of energy to heat the pan to the desired temperature as well as any other information, such as the time required for the frying pan to reach the desired temperature. If the pan includes a temperature sensor, the pan can provide the temperature to the system, thereby allowing a closed loop control system for the pan.

The present invention is suitable for use with a variety of different user interfaces. The user interface of the illustrated embodiment, includes a display 43 and controls 36, 37, 38. In the current embodiment, the display 43 and controls 36, 37, 38 cooperate with the controller 68 to provide output to the user about the temperature of the cooking device and input about the desired temperature of the cooking device. In other embodiments, the user interface may display different output or accept different input. In alternative embodiments, the user interface may also include additional user interface elements that interact with a user.

In one configuration, perhaps best shown in FIG. 1, a user places the cooking appliance body 20 near the inductive power supply 2 and enters a desired temperature or temperature schedule by way of smart handle 30. Smart handle 30 then sends information regarding the desired temperature and current temperature of the cooking appliance to the inductive power supply by way of the communication circuitry 72, 88. Controller 86 adjusts the power supplied by the inductive power supply 2 to primary 80, thus allowing accurate control of the temperature within cooking appliance 4.

In another configuration, perhaps best shown in FIG. 5, a user places the smart handle 30 near the inductive power supply 2 and the inductive power supply 2 charges the power storage circuit in the smart handle 30. The display 43 may indicate that the smart handle is being charged while in this configuration.

Figure 10:
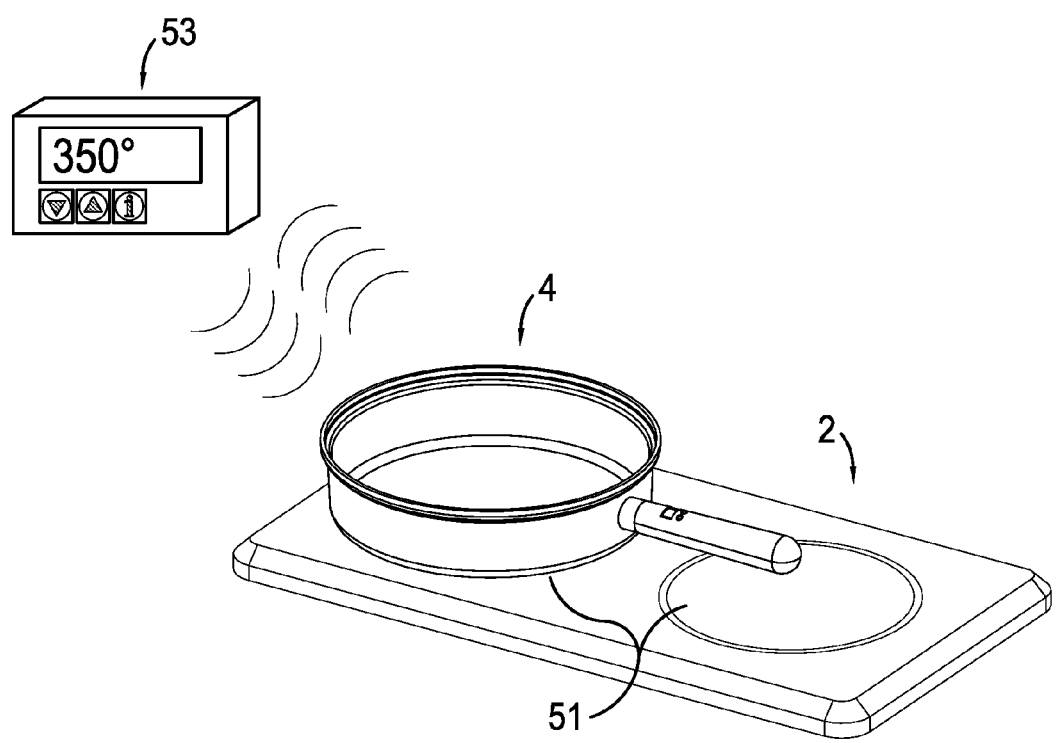
FIG. 10 illustrates a perspective view of one embodiment of an inductive cooking system of the present invention including an auxiliary controller.

In an alternative embodiment, illustrated in FIG. 10, the cooking appliance body 20 may be placed in proximity of one charging area 51 at the same time as the smart handle 30 is placed in proximity of a different charging area 51. Accordingly, power may be provided to the smart handle and heat to the cooking appliance body 20 at the same time.

In another embodiment illustrated in FIGS. 12-16, a cooking appliance 204 includes a smart handle 230, a body 220, and a base. Consistent with the teachings of the previous embodiments, the body 220 is capable of being heated by an inductive power supply 2 and the smart handle 230 is capable of receiving and utilizing power from the inductive power supply 2. For example, in previously discussed embodiments, the smart handle 230 includes a secondary coil that is capable of inductive coupling to receive power from the inductive power supply 2. In other embodiments, the smart handle 230 may receive energy from a secondary 245 located external from, but connected to the smart handle 230. In this embodiment, the base is a pan base 205, which includes a secondary 245 and a thermal sensor 244 that are electrically connected to the smart handle 230. This allows an inductive power supply 2 to transfer energy concurrently to the body 220 and the smart handle 230. As with the previous embodiments, alternative inductive cooking system embodiments are also contemplated. For example, the cooking appliance 204 need not be a pan with a smart handle as illustrated in the figures. The cooking appliance 204 may be configured to take the form of a variety of appliances as discussed previously.

Figure 14:
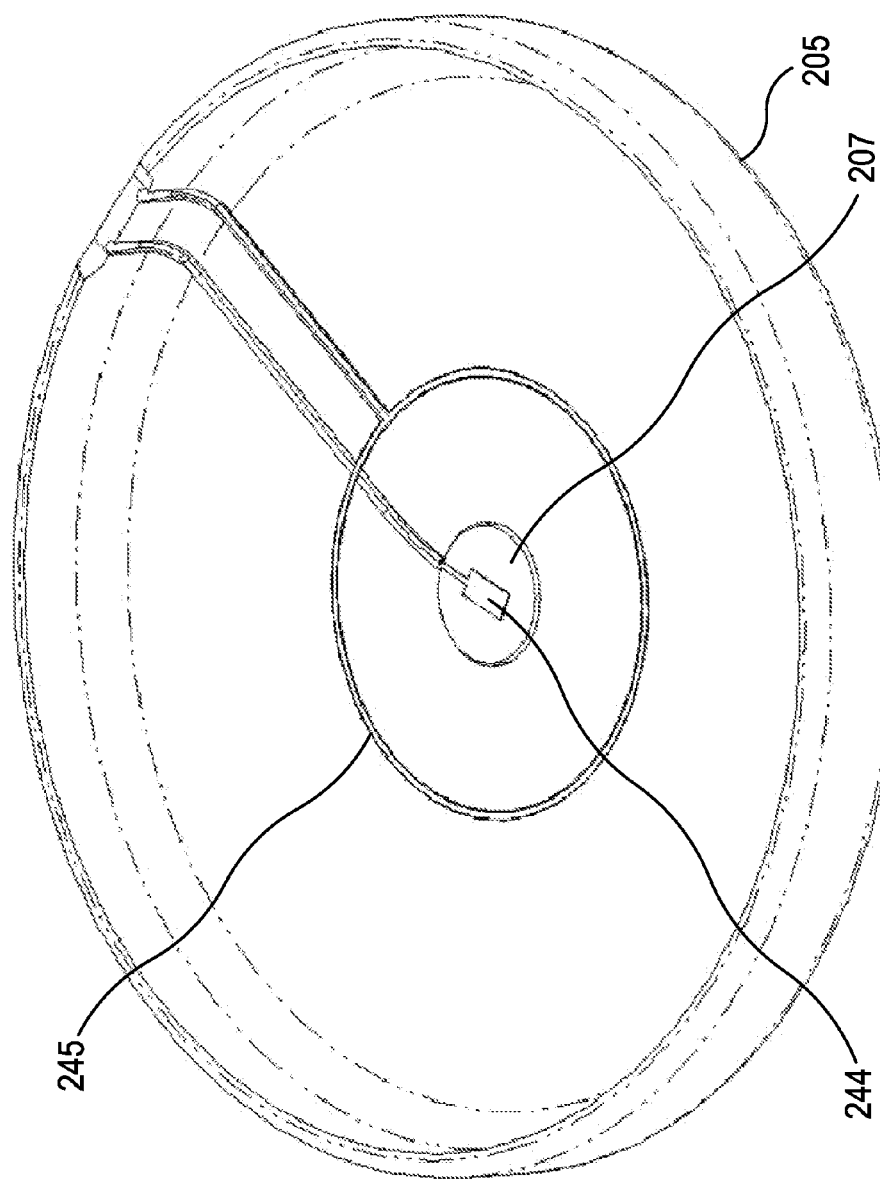
FIG. 14 illustrates a perspective view of the pan base of the cooking appliance of the FIG. 12 embodiment.
Figure 15:
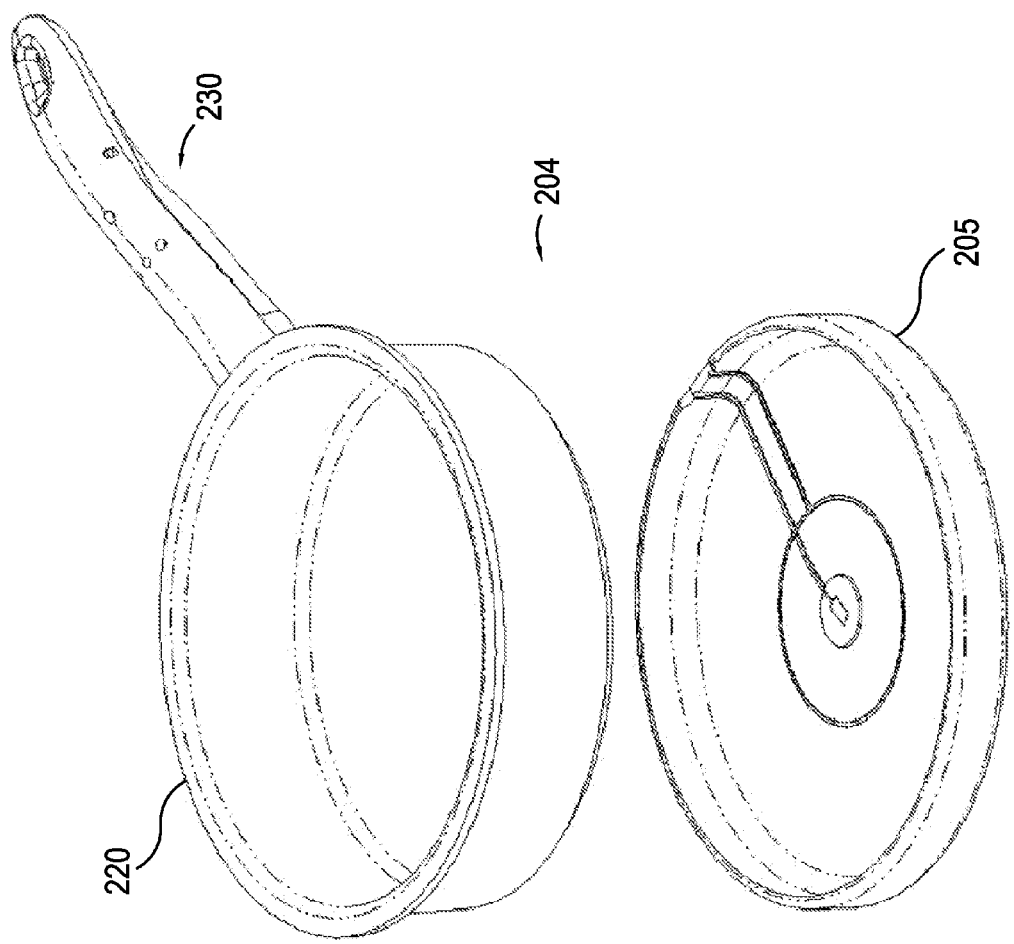
FIG. 15 illustrates an exploded view of the cooking appliance of the FIG. 12 embodiment.
Figure 16:
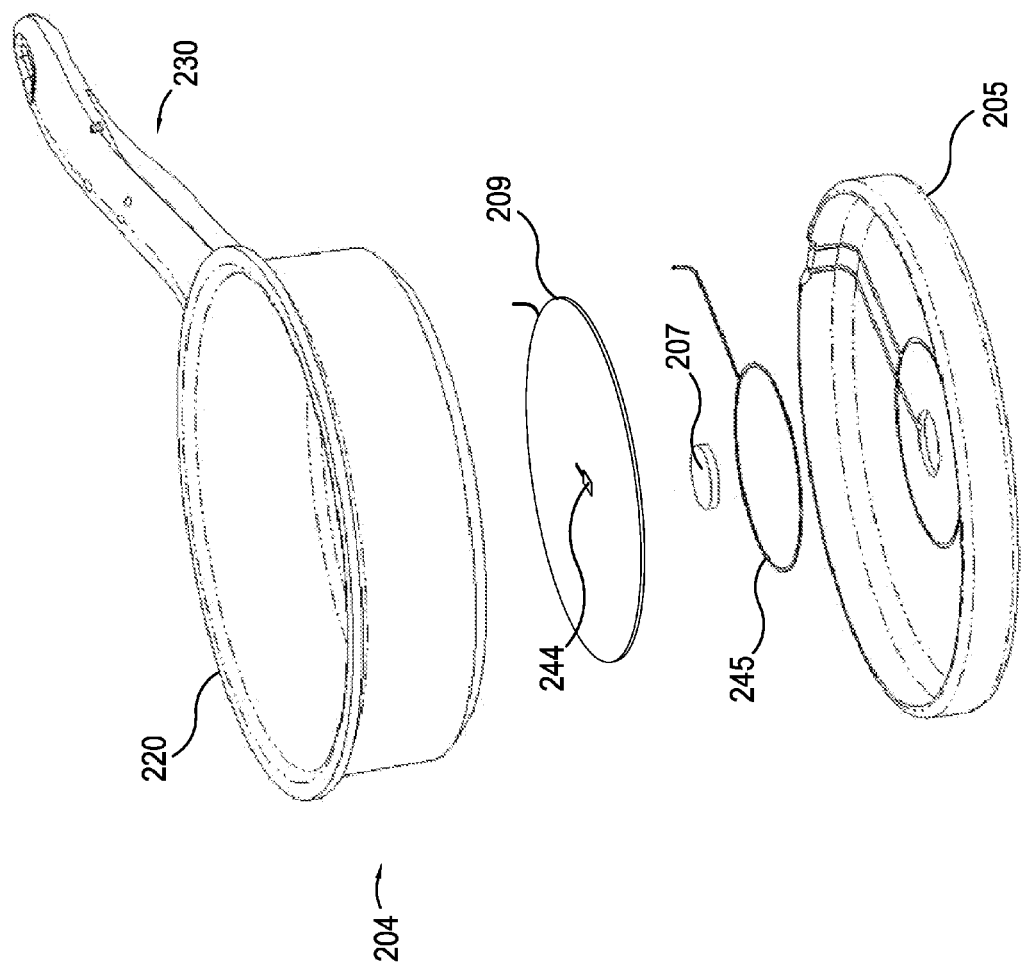
FIG. 16 illustrates another exploded view of the cooking appliance of the FIG. 12 embodiment.

Referring to FIGS. 14 and 16, the pan base 205 can be made of a material that has sufficient magnetic permeability to allow inductive power transfer to the secondary 245 and the body 220. The pan base 205 material may also be non-conductive. That is, the pan base 205 may allow the heated body 220 to be moved from a cooking area to a serving area without burning the serving area. For example, some materials that meet these conditions include rubber or high-temperature plastic. The illustrated pan base 205 includes cavities to hold the secondary 245, a temperature sensor 244, a magnet 207, and channels for leads from the smart handle 230 to the temperature sensor 244 and the secondary 245. In this embodiment, the pan base 205 is permanently attached to the body 220 using an adhesive. In alternative embodiments a different fastener system may be used, and the connection between the body 220 and the pan base 205 may be non-permanent.

With reference to FIG. 16, an insulation layer 209 may be placed between the pan base 205 and the body 220. The insulation layer 209 protects components from heat damage because of direct contact with the body 220. These components include the secondary 245, magnet 207, and the wire leads to the secondary 245 and thermal sensor 244. In the current embodiment, the insulation layer 209 includes an aperture to allow the thermal sensor 244 to directly contact the body 220 to get accurate temperature readings. That is, the leads to the thermal sensor 244 are under the insulation layer 209 relative to the illustrated body 220, but the thermal sensor 244 can directly contact the body 220 through the aperture. The insulation layer may be made of a ceramic material or another type of magnetically permeable insulative material.

In the illustrated embodiment, a magnet 207 is shown. The magnet may be utilized to assist in aligning the inductive power supply 2 and the cooking appliance 204. In alternative embodiments, the magnet may be omitted. Alignment may be facilitated in other ways or the system may be able to maintain efficient power transfer without precise alignment of the inductive power supply 2 and the cooking appliance 204.

The secondary 245 of the current embodiment is configured to receive inductive power from the inductive power supply 2 while the body 220 concurrently receives power. The secondary 245 configuration in this embodiment includes a lower mutual inductance between the inductive power supply 2 and the secondary 245 so that the secondary 245 receives an appropriate amount of power while the inductive power supply 2 simultaneously supplies an appropriate amount of power to the body 220 for heating. For example, the secondary 245 has a relatively few number of turns so that it receives a fractional amount of power that the inductive power supply is outputting to the cooking appliance 204. The diameter of the secondary 245 also plays a role in the coupling between the inductive power supply 2 and the secondary 245. Accordingly, the diameter of the secondary 245 is selected to ensure an appropriate amount of power is provided to the coil. The secondary 245 diameter may be adjusted during manufacture as compared to the primary in the inductive power supply 2 to adjust the amount of power received by the secondary 245.

The smart handle 230 of this embodiment is similar to the smart handle 30 described in detail above. In this embodiment, the smart handle 230 has the ability to electrically connect to a secondary 245 and temperature sensor 244 located within the pan base 205. The smart handle 230 does not include a secondary 245 within the handle and it may optionally include power storage circuitry 66. The remaining circuitry and operation may be essentially the same as the previous embodiments. The smart handle 230 may include the same or a different user interface as the one described above with respect to the smart handle 30. With reference to the illustrated embodiment of FIGS. 12 and 13, the interface may include indicators 276, 277, 278, such as light emitting diodes, to communicate to a user the current heat level setting of the cooking appliance 204. The smart handle 230 can also include a switch 275 or push button that allows a user to select between heat level settings and an off position. The heat level settings may correspond to predetermined temperature settings that can be monitored through the temperature sensor 244. For example, each activation of the switch 275 may toggle between OFF, Low-Heat, Medium-Heat, and High-Heat states. In the current embodiment, an indicator 276, 277, 278 corresponding to each state, except the OFF state, lights-up when that state is selected. In this example, all of the indicators 276, 277, 278 are off when the cooking appliance 204 is in the OFF state. In an alternative embodiment, predetermined frequencies are associated with each state and frequency jumps result in a cooking appliance 204 temperature change.

One method for operating the cooking appliance 204 of this embodiment is similar to the methods described above with respect to FIGS. 8 and 11. The primary difference is that the object identification step 138 includes identifying the object as a cooking appliance 204 with a secondary 245 capable of receiving power during a heating mode. Furthermore, the current embodiment does not require the steps of identifying the object as a smart handle or entering a charge mode. If a cooking appliance 204 with a pan base 205 is identified, the system enters a heating mode. In this embodiment, the heating mode includes simultaneously providing energy to the pan body 220 and the secondary 245 located in the pan base 205. The amount of power transferred during this heating mode may be adjusted to be more than the previous embodiments because the inductive power supply 2 is providing power to both the secondary 245 and the body 220. The configuration of the secondary 245, as discussed above, may determine how much additional power to supply to the cooking appliance 204. Other than the above modifications, the method of the current embodiment is comparable to those described previously.

The above description is that of the current embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The invention claimed is:

1. A cooking system comprising:
an inductive power supply and a cooking appliance, said cooking appliance capable of being heated by said inductive power supply and capable of being powered by said inductive power supply, wherein said cooking appliance is removably positionable in proximity to said inductive power supply in a power receiving position, wherein in said power receiving position said cooking appliance is at least one of heated by said inductive power supply and powered by said inductive power supply;
wherein said inductive power supply includes:
a tank circuit having a primary for transferring power to said cooking appliance;
primary communication circuitry for receiving information from said cooking appliance;
a controller programmed to control operation of said inductive power supply in response to said information received from said cooking appliance;
wherein said cooking appliance includes:
a first inductive power receiving portion, said first inductive power receiving portion being configured to inductively couple with said primary, wherein said first inductive power receiving portion heats said cooking appliance;
a second inductive power receiving portion, said first inductive power receiving portion being configured to inductively couple with said primary, wherein said second inductive power receiving portion provides power to circuitry of said cooking appliance;
wherein said second inductive power receiving portion and said first inductive power receiving portion are disposed relative to each other such that, in said power receiving position, said second inductive power receiving portion is between said first inductive power receiving portion and said primary of said inductive power supply;
an insulation portion located between said first inductive power receiving portion and said second inductive power receiving portion, wherein said insulation portion protects said second inductive power receiving portion from heat damage from said first inductive power receiving portion;
a temperature sensor for monitoring a current temperature of said cooking appliance;
a user interface configurable to select a desired temperature setting of said cooking appliance; and
secondary communication circuitry for transmitting to said inductive power supply at least one of information regarding said desired temperature, information regarding said current temperature, and an instruction to change a power output characteristic.

2. The system of claim 1 wherein said first inductive power receiving portion includes a metal portion, where said inductive power supply is capable of inducing current within said metal portion to produce heat.

3. The system of claim 1 wherein said first inductive power receiving portion includes a secondary coil capable of transferring power to a heating element in said cooking appliance.

4. The system of claim 1 wherein said primary communication circuitry includes a receiver capable of RF communication with said secondary communication circuitry, where said secondary communication circuitry includes a transmitter.

5. The system of claim 1 wherein said temperature sensor directly contacts said first inductive receiving portion to obtain temperature readings, wherein said insulation portion includes an aperture wherein leads from said temperature sensor pass through said aperture and are protected by said insulation portion from heat produced by said inductive power receiving portion.

* * * * *